United States Patent [19]

Satow et al.

[11] 4,194,486

[45] Mar. 25, 1980

[54] IGNITION MEANS FOR ROTARY PISTON ENGINES

[75] Inventors: Haruhiko Satow; Tadakazu Ueda, both of Hiroshima; Ikuo Ogasawara, Nagoya, all of Japan

[73] Assignees: Toyo Kogyo Co., Ltd., Hiroshima; NGK Spark Plug Co., Ltd., Nagoya, both of Japan

[21] Appl. No.: 877,732

[22] Filed: Feb. 14, 1978

[30] Foreign Application Priority Data

Feb. 15, 1977 [JP] Japan .............................. 52/17825[U]
Feb. 15, 1977 [JP] Japan .............................. 52/17826[U]

[51] Int. Cl.² .................................................. F02B 53/12
[52] U.S. Cl. .............................. 123/210; 123/169 EL
[58] Field of Search ............... 123/210, 211, 169 R, 123/169 EL, 169 G

[56] References Cited

U.S. PATENT DOCUMENTS 3,831,562  8/1974  Paxton et al. ...................... 123/210

FOREIGN PATENT DOCUMENTS 48-91431 11/1973 Japan ....................... 123/210
49-36984 10/1974 Japan ....................... 123/210

Primary Examiner—Michael Koczo
Attorney, Agent, or Firm—Fleit & Jacobson

[57] ABSTRACT

An ignition device for rotary piston engines. The device has an ignition plug disposed in a bore formed in an inner wall surface of a casing of the engine. The plug is of the surface gap and air gap discharge type and has a discharge end constituted by inner and outer electrodes spaced apart from each other through a surface gap discharge distance defined by a surface of an insulative sleeve encircling the inner electrode and an air gap discharge distance defined between the insulative sleeve and the outer electrode. The surface gap discharge distance is not less than 0.6 mm and not greater than 1.3 mm. The air gap discharge distance is not less than 0.7 mm and not greater than 1.4 mm. The surface gap discharge distance is not greater than the air gap discharge distance. The outer electrode has a tip end axially retreated with respect to the surface of the insulative sleeve by a distance between 0.3–1.0 mm. The ignition plug is located with the discharge end disposed in proximity to the inner wall surface of the casing.

3 Claims, 4 Drawing Figures

IGNITION MEANS FOR ROTARY PISTON ENGINES

The present invention relates to ignition means for internal combustion engines and more particularly to ignition means for rotary piston engines.

In general, rotary piston engines include a casing which comprises a rotor housing having an inner wall surface of trochoidal configuration and a pair of side housings secured to the opposite sides of the rotor housing to define a rotor cavity of trochoidal cross-section. A rotor of substantially polygonal configuration is disposed in the rotor cavity for rotation with apex portions in sliding contact with the wall surface of the rotor housing. In this type of rotary piston engines, it is therefore necessary to locate ignition plugs in such a manner that they do not project into the cavity. For the purpose, the casing of the rotary piston engine is usually formed at the inner wall with bores for locating the ignition plugs with their end portions retreated from the inner wall surface of the casing.

Conventionally, such bores for ignition plugs have provided adverse effects on the operation of the rotary piston engines. In idling operation of the engine, substantial amount of combustion gas is carried over from the exhaust working chamber to the compression working chamber through the ignition plug bores causing incomplete combustion or rough engine operation. Further, the bores for the ignition plugs are not adequately scavenged under the idling operation so that there will be increased possibilities of misfire and incomplete combustion. In high speed, heavy load operation, charge of mixture in the compression working chamber is allowed to pass through the ignition plug bores into the exhaust working chamber resulting in a decrease in the engine output.

In order to eliminate the above problems, it has been proposed by Japanese utility model publication Sho 49-36984 to use or surface gap creeping discharge ignition plugs in such a manner that their discharge ends are located substantially flush with the inner wall surface of the casing. According to the proposal, the spaces in the bores are substantially occupied by the ignition plugs so that there will be a significant decrease in the amount of residual combustion gas which may otherwise be retained in the bores and carried over into the compression working chamber.

However, it has been found that the proposed arrangement has not been satisfactory because the or surface gap creeping discharge ignition plugs are apt to be rapidly smudged by carbon sludges which may be produced through combustion of lubricant oil. In rotary piston engines, it is inherently necessary to maintain a supply of lubricant oil into the combustion chamber for the purpose of lubrication of gas-sealing members. Thus, it is unavoidable to have a certain amount of carbon sludges produced in the course of combustion of mixtures. Such carbon sludges may be deposited on the end surfaces of the insulating material which provide or surface gap surfaces, and may possibly cause failure of discharge.

It has also been proposed by Japanese patent application Sho 48-14368 which has been disclosed for public inspection on Nov. 28, 1973 under the disclosure No. Sho 48-91431 to provide ignition means for internal combustion engine by making use of a creeping and air-gap discharge ignition plug. In the aforementioned patent application, it is stated that the ignition plug under proposal may be used in rotary piston engines as well as in other types of gasoline engines. The ignition plug as proposed by the patent application is found as disadvantageous in that it has a surface gap distance which is so large that the gap surface may be smudged as in the conventional surface gap ignition plugs. Further, in this type of creeping and air-gap discharge ignition plug, there is a great possibility that the air-gap is bridged or clogged by carbon sludges with the result that the spark of discharge is weakened to such an extent that failure of ignition may be caused.

The present invention has therefore an object to provide ignition means for rotary piston engines which can eliminate the aforementioned problems of conventional ignition means.

Another object of the present invention is to provide ignition means for rotary piston engine which is reliable and can ensure positive firing of combustible mixture.

A further object of the present invention is to provide ignition means for rotary piston engine which can substantially decrease the amount of carried-over combustion gas as well as the amount of combustible mixture which is allowed to pass from the compression working chamber to the exhaust working chamber.

According to the present invention, the above and other objects can be accomplished by a rotary piston engine comprising a casing which includes a rotor housing having opposite sides and an inner wall surface of trochoidal configuration and a pair of side housings secured to the opposite sides of the rotor housing and having inner wall surfaces which define a rotor cavity together with the inner wall surface of the rotor housing, a substantially polygonal rotor disposed in said rotor cavity for rotation with apex portions in sliding contact with the trochoidal inner wall surface of the rotor housing, ignition means including bore means formed in the inner wall surface of the casing and ignition plug means disposed in said bore means, said ignition plug means being of a creeping or surface and air-gap discharge type having a discharge end constituted by inner and outer electrodes spaced apart each other through a surface gap distance defined by an insulative creeping surface and an air-gap discharge distance, said creeping discharge or surface gap distance being not less than 0.6 mm and not greater than 1.3 mm, said air-gap distance being not less than 0.7 mm and not greater than 1.4 mm, said surface gap distance being not greater than said air-gap distance, said ignition plug means being located with the discharge end disposed in proximity to the inner wall surface of the casing.

It has been found that, with the air-gap smaller than 0.7 mm, there is a great possibility that the air-gap is clogged or bridged by carbon sludges. Thus, the spark of discharge is weakened to such an extent that misfire occurs very often. With the air-gap greater than 1.4 mm, appreciable amount of combustible mixture may be allowed to flow therethrough under a high speed, heavy load operation from the compression working chamber to the exhaust working chamber. Therefore, there will be a decrease in the engine output. Further, any increase in the air-gap beyond 1.4 mm is not effective in further improving the ignition property. It has thus been determined that a recommendable value of the air-gap is between 0.7 and 1.4 mm.

With respect to the creeping or surface distance, it has been found that, with the distance less than 0.6 mm, an adequate mechanical strength cannot be maintained in the insulator in the ignition plug and the insulator may possibly be broken in use. With the creeping or surface distance greater than 1.3 mm, however, it will be required to increase the voltage cross the electrodes. Further, there will be an increased possibility that the creeping surface is smudged by carbon deposits when the creeping distance is increased. Therefore, it is recommendable to determine the creeping distance between 0.6 and 1.3 mm.

In view of the facts that the creeping surface is apt to be easily smudged and that the spark along the creeping surface does not contribute to ignition so much as the spark across the air-gap does because the creeping spark may be quenched by the insulating material providing the creeping surface, it is recommendable that the air-gap is always not smaller than the creeping distance.

According to a further feature of the present invention, the outer electrode has a tip end which is axially retreated with respect to the creeping surface by a distance not greater than 1.0 mm. It has been found that by having the tip end of the outer electrode retreated axially with respect to the creeping surface, ignition property can be significantly improved. It is understood that this improvement in the ignition property is caused by the fact that the scavenging of the ignition plug is enhanced and the quenching effect by the outer electrode is moderated in the aforementioned arrangement. Further, the discharge spark may have an axially extending portion which may have a preferable effect on the ignition of mixture. It has been found, however, that the improvement is not so significant even though the distance of retreatment is increased beyond 1.0 mm. Further, an increase in the distance of retreatment causes an increase in the space of the bore through which the combustion gas is carried over into the compression working chamber or the unburnt mixture is allowed to pass from the compression working chamber into the exhaust working chamber. Thus, the distance of retreatment of the outer electrode tip end should be limited within 1.0 mm.

The above and other objects and features of the present invention will become apparent from the following descriptions of preferred embodiments taking reference to the accompanying drawings, in which.

Figure 1:
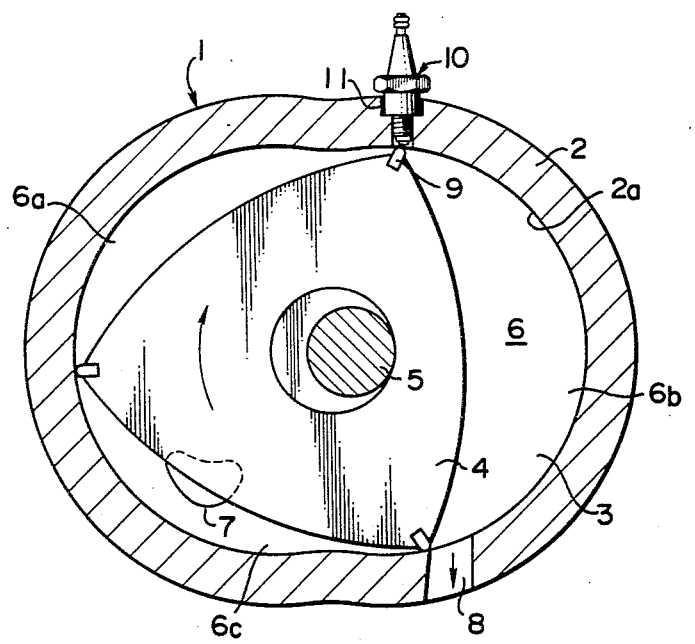
FIG. 1 is a sectional view of a rotary piston engine embodying the feature of the present invention.

Referring to the drawings, particularly to FIG. 1, there is shown a rotary piston engine including a casing 1 which is comprised of a rotor housing 2 having an inner wall surface 2a of a trochoidal configuration and a pair of side housings 3 secured to the opposite sides of the rotor housing 2. In the casing 1, thre is disposed a substantially triangular rotor 4 which is carried by an eccentric shaft 5 for rotation as shown by an arrow with apex seals 9 on respective apex portions in sliding contact with the inner wall surface 2a of the rotor housing 2. Thus, three working chambers 6 are defined in the casing 1 by the inner wall surface 2a of the rotor housing 2 and the flanks of the rotor 4. In the position of the rotor 4 shown in FIG. 1, the chamber 6a is in compression stroke, the chamber 60b in exhaust stroke and the chamber 6c in intake stroke.

In the illustrated embodiment, one of the side housings 3 is formed with an intake port 7 which opens to the intake working chamber 6c. The rotor housing 2 has an exhaust port 8 which opens to the exhaust working chamber 6b. The rotor housing 2 is further formed with an ignition plug bore 11 on which an ignition plug 10 is installed.

Figure 2:
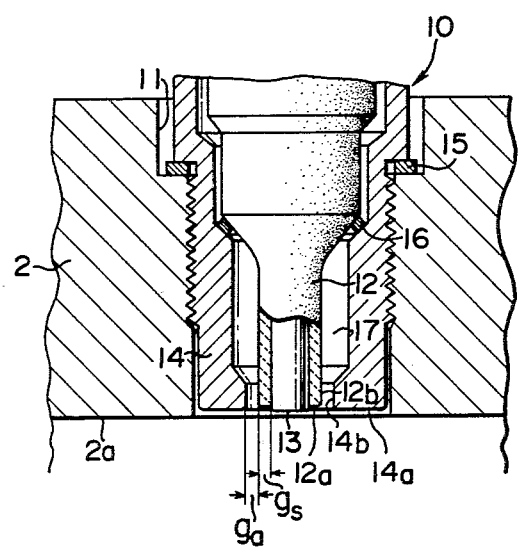
FIG. 2 is a fragmentary sectional view showing an example of the ignition plug and installation thereof.

Referring now to FIG. 2, the ignition plug 10 comprises a center or inner electrode 13 which is housed in an insulative sleeve 12 and an outer tubular electrode 14 which encircles the insulative sleeve 12 with a space 17 therebetween. The insulative sleeve 12 may be made of a suitable insulating material such as procelain and has a tip end surface 12a which provides a creeping surface or surface gap having a creeping or gap distance $g_s$. The inner electrode 13 has a tip end slightly projecting beyond the end surface 12a of the sleeve 12. The outer electrode 14 is threaded into the plug bore 11 with the intervention of a gasket 15 made of copper or aluminum and a packing 16. The outer electrode 14 has a tip end surface 14a and an inner peripheral surface 14b which is confronting with an outer peripheral surface 12b of the insulative sleeve 12 so as to provide an air-gap $g_a$. The ignition plug 10 is positioned in the bore 11 in such a manner that the end of the inner electrode 13 is retreated from the inner wall surface 2a of the rotor housing by a small distance of 1 to 4 mm, preferably, 1 to 2 mm so that the firing section of the plug 10 is located in proximity to the surface 2a. The ignition plug 10 has the creeping or surface gap distance $g_s$ of 0.6 to 1.3 mm and the air-gap $g_a$ of 0.7 to 1.4 mm, and the air-gap $g_a$ is not smaller than the creeping distance $g_s$ for the reasons previously described.

The above described ignition plug 10 is fired by a suitable power source. The above dimensioning of the ignition plug 10 is effective to provide a preferable energy distribution between the creeping surface or surface gap 12a and the air-gap $g_a$ so that the voltage required for producing the spark discharge can be minimized. Further, even when the creeping surface 12a is smudged by carbon deposits, adequate spark can be produced at the air-gap $g_a$. Since the firing section of the ignition plug 10 is located in proximity to the inner wall surface 2a of the rotor housing 2, the void space in the plug bore 11 can be significantly decreased so that it is possible to decrease carryover of combustion gas into the compression working chamber and also decrease flow of combustible mixture from the compression working chamber into the exhaust working chamber. Thus, it is possible to improve the ignition property and prevent any decrease in the engine output.

Figure 3:
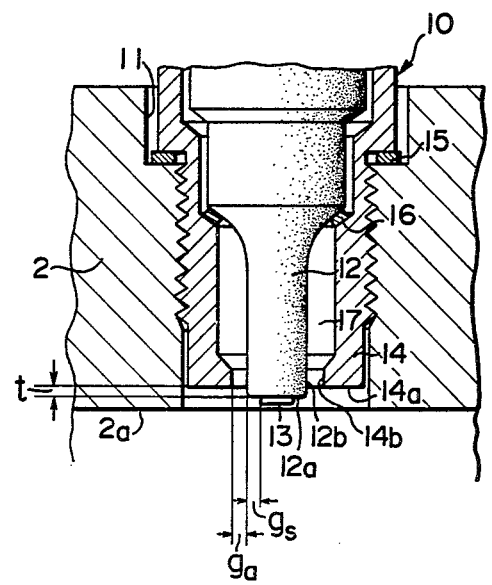
FIG. 3 is a fragmentary sectional view similar to FIG. 2 but showing another embodiment; and, FIG. 4 is a diagram showing the relationship between the ignition property and the distance of retreatment of the outer electrode tip end.

Referring to FIG. 3, the ignition plug 10 shown therein is substantially identical in construction to the ignition plug shown in FIG. 2 except that the end surface 14a is axially retreated with respect to the creeping surface 12a by a distance t. The arrangement has been found as advantageous in that the ignition property can be improved significantly.

In order to confirm the effect of the distance t on the ignition property, tests have been made using ignition plugs having the creeping or surface gap distance of 0.8 mm, the air-gap of 1.0 mm and various distance t of retreatment of the outer electrode end surface 14a. As the power source, use has been made of a high energy one such as that having an energy greater than 60 mJ and a voltage across the electrodes greater than 30 Kv.

The ignition property has been measured in terms of a range of fuel flow (1/h) in idling operation wherein the number of misfire is below 10 times/min. The results are shown in FIG. 4.

Figure 4:
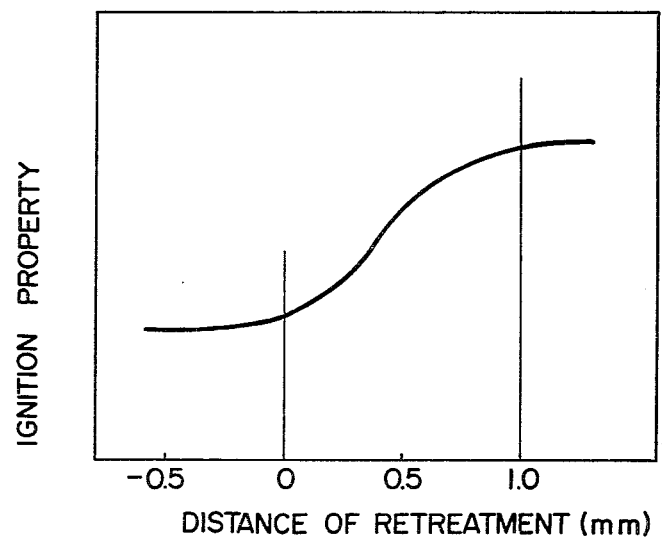

It will be noted in FIG. 4 that an increase in the retreatment distance t has an effect of improving the ignition property as long as the distance t is not greater than 1.0 mm. It should particularly be noted that a noticeable improvement can be accomplished with the distance t of 0.3 to 1.0 mm. It is understood that the structure of the ignition plug 10 as shown in FIG. 3 can provide an improved scavenging of the space 17 because the flow resistance is decreased at the entrance to the space 17. Further, it is possible in this arrangement of ignition plug to decrease the quenching effect which will be applied by the outer electrode 14. It should further be noted that in the plug as shown in FIG. 3 there is formed a discharge spark having a portion extending in the axial direction of the ignition plug and therefore perpendicular to the mixture flow. The aforementioned facts are believed as contributing to the improvement of the ignition property.

It has been found, however, that any increase in the retreatment distance t beyond 1.0 mm no longer provides any improvement. This is understood as being caused by the fact that the void space in the bore 11 becomes so large that it adversely affects on the ignition property. On the other hand, when the distance t is below 0, that is, the tip end of the outer electrode is actually projected with respect to the creeping surface, the ignition property becomes comparatively poor. Thus, it is recommendable to limit the distance t of retreatment of the outer electrode tip end between 0 and 1.0 mm, preferably between 0.3 and 1.0 mm.

The invention has thus been shown and described with reference to specific embodiments, however, it should be noted that the invention is in no way limited to the details of the illustrated structures but changes and modifications may be made without departing from the scope of the appended claims.

We claim:

1. Rotary piston engine comprising a casing which includes a rotor housing having opposite sides and an inner wall surface of trochoidal configuration and a pair of side housings secured to the opposite sides of the rotor housing and having inner wall surfaces which define a rotor cavity together with the inner wall surface of the rotor housing, a substantially polygonal rotor disposed in said rotor cavity for rotation with apex portions in sliding contact with the trochoidal inner wall surface of the rotor housing, ignition means including bore means formed in the inner wall surface of the casing and ignition plug means disposed in said bore means, said ignition plug means being of surface gap and air gap discharge type having a discharge end constituted by inner and outer electrodes spaced apart from each other through a surface gap discharge distance defined by a surface of an insulative sleeve encircling the inner electrode and an air gap discharge distance defined between the insulative sleeve and the outer electrode, said surface gap discharge distance being not less than 0.6 mm and not greater than 1.3 mm, said air gap discharge distance being not less than 0.7 mm and not greater than 1.4 mm, said surface gap discharge distance being not greater than said air gap discharge distance, the outer electrode having a tip end axially retreated with respect to the surface of the insulative sleeve by a distance between 0.3–1.0 mm, and said ignition plug means being located with the discharge end disposed in proximity to the inner wall surface of the casing.

2. Rotary piston engine in accordance with claim 1 in which said discharge end of the plug means is retreated from the inner wall surface of the casing by a distance between 1 and 4 mm.

3. Rotary piston engine in accordance with claim 1 in which said discharge end of the plug means is retreated from the inner wall surface of the casing by a distance between 1 and 2 mm.

* * * * *